(12) United States Patent
Kanzawa et al.

(10) Patent No.: US 7,718,718 B2
(45) Date of Patent: May 18, 2010

(54) POLYLACTIC ACID RESIN COMPOSITION, PROCESS FOR PRODUCING THE SAME, BIAXIALLY STRETCHED POLYLACTIC ACID FILM, AND MOLDED ARTICLES THEREOF

(75) Inventors: Takeshi Kanzawa, Otsu (JP); Sakayuki Kobayashi, Nagoya (JP); Minoru Yoshida, Shiga-gun (JP); Fumie Sakida, Shunan (JP); Jiro Kumaki, Nagoya (JP)

(73) Assignee: Toray Industries, Inc. (JP)

( * ) Notice: Subject to any disclaimer, the term of this patent is extended or adjusted under 35 U.S.C. 154(b) by 1250 days.

(21) Appl. No.: 10/550,666

(22) PCT Filed: Feb. 10, 2004

(86) PCT No.: PCT/JP2004/001390

§ 371 (c)(1),
(2), (4) Date: Sep. 26, 2005

(87) PCT Pub. No.: WO2004/087812

PCT Pub. Date: Oct. 14, 2004

(65) Prior Publication Data

US 2007/0032577 A1    Feb. 8, 2007

(30) Foreign Application Priority Data

Mar. 28, 2003    (JP) ............................. 2003-090085

(51) Int. Cl.
*C09D 101/18*    (2006.01)

(52) U.S. Cl. ........................................ 524/31; 524/556

(58) Field of Classification Search ................... 524/31, 524/556
See application file for complete search history.

(56) References Cited

U.S. PATENT DOCUMENTS

| 5,216,050 A | 6/1993 | Sinclair et al. |
| 6,207,792 B1 | 3/2001 | Gruber et al. |

FOREIGN PATENT DOCUMENTS

| JP | 2003 082160 A | 3/1993 |
| JP | 8-59949 A | 3/1996 |
| JP | 09 235455 A | 9/1997 |
| JP | 09 302207 A | 11/1997 |
| JP | 2001-4078 A | 1/2001 |
| JP | 2002 173553 A | 6/2002 |
| WO | 92/04413 A | 3/1992 |
| WO | 98/29506 A | 7/1998 |
| WO | 02/088230 A1 | 11/2002 |
| WO | 02/098982 A | 12/2002 |

OTHER PUBLICATIONS

Ogata et al., Journal of Applied Polymer Science, vol. 85, 1219-1226 (2002).*
Nobuo Ogata, et al., "Structure and Physical Properties of Cellulose Acetate/Poly($_L$-lactide) Blends," Journal of Applied Polymer Science, vol. 85, pp. 1219-1226, 2002.
J.L. Eguiburu et al., "Blends of amorphous and crystalline polylactides with poly(methyl methacrylate) and poly(methyl acrylate): a miscibility study", Polymer, vol. 38 No. 26, pp. 6891-6897, 1998.
P. Xing et al., "Miscibility and crystallization of poly (beta-hydroxybutyrate) and poly(p-vinylphenol) blends", Macromolecules, ACS, vol. 30, No. 9, pp. 2726-2733, May 5, 1997.

* cited by examiner

*Primary Examiner*—Robert D. Harlan
(74) *Attorney, Agent, or Firm*—DLA Piper LLP (US)

(57) ABSTRACT

A resin composition contains poly(lactic acid) and a cellulosic ester, a resin composition excellent in transparency, mechanical properties, and thermostability; a biaxially drawn film containing poly(lactic acid) and at least one compound selected from cellulosic esters, poly(meth)acrylates, and polyvinyl compounds having a glass transition temperature of 60° C. or higher; and a biaxially drawn film excellent in transparency, mechanical properties, and thermostability. The resin composition is obtained by melt-kneading a poly (lactic acid) polymer with a weight average molecular weight of 50,000 or higher and a cellulosic ester; a resin composition excellent in transparency and having luminous transmittance of 40% or higher for visible light with 400 nm; a molded article and a film made of the resin composition; a poly(lactic acid) biaxially drawn film containing a poly(lactic acid) polymer with a weight average molecular weight of 50,000 or higher and at least one compound selected from cellulosic esters, poly(meth)acrylates, and polyvinyl compounds having a glass transition temperature of 60° C. or higher; a poly(lactic acid) biaxially drawn film excellent in transparency and having film haze of 10% or lower.

23 Claims, 3 Drawing Sheets

POLYLACTIC ACID RESIN COMPOSITION, PROCESS FOR PRODUCING THE SAME, BIAXIALLY STRETCHED POLYLACTIC ACID FILM, AND MOLDED ARTICLES THEREOF

TECHNICAL FIELD

This disclosure relates to a poly(lactic acid) polymer composition comprising poly(lactic acid) and a cellulosic ester as main components, its production method, a molded article, a film, and a sheet of the composition.

BACKGROUND ART

Poly(lactic acid) has a high melting point and has highly been expected to be a biodegradable polymer melt-moldable and excellent in practical use. However, the poly(lactic acid) has a slow crystallization speed and is limited in crystallization and use for molded articles. For example, in the case of extrusion molding, not only long molding cycle time and heat treatment after molding is required but also the deformation is significant at the time of molding and heat treatment and thermostability is poor and thus there are serious problems for the practical use. Therefore, a method for making molding possible within a practically applicable molding cycle and improving the thermostability has been desired. Further, in the case of being used as a film, the poly(lactic acid) film has the highest tensile strength and modulus of elasticity and is regarded to be excellent in luster and transparency among various type of biodegradable films, however the glass transition temperature of the polymer is relatively low, so that it has been limited in the uses requiring thermostability. Accordingly, the thermostability (thermal deformation temperature) is required to be high.

On the other hand, cellulose and cellulose derivatives such as cellulosic esters and cellulose ether are biomass materials produced in the largest quantity all over the globe and are biodegradable polymers and therefore, they have drawn close attention. Further, as a method of melt molding these cellulose derivatives, a method described in Japanese Patent Application Laid-Open No. 53-11564 and comprising mixing a water soluble plasticizer such as polyethylene glycol with cellulose acetate and melt-spinning the resulting mixture has been known. However, use of a plasticizer with a high hygroscopic property such as polyethylene glycol is limited in the application and therefore it is undesirable and a widely applicable method is desired.

To mix two or more types of polymers has been known as a polymer blend or a polymer alloy and has been employed popularly as a method of improving the disadvantages of respective polymers. However, generally in the case of mixing two types of polymers, many polymers are separated in respective phases and it is common that one phase has an uneven coarse dispersion structure with several µm or larger. In such a dispersion state, many polymers become opaque and inferior in the mechanical strength and tend to cause Barus effect at the time of discharging in the case of melt kneading, resulting in poor productivity. On the other hand, although rarely, two type polymers are evenly mixed and these polymers are generally called compatible polymers or affinitive polymers and expected to have excellent properties, however such examples are limited.

Japanese Patent Application Laid-Open No. 11-241008 discloses methods of obtaining biodegradable polymer compositions having both flexibility and thermostability by adding natural polymers to resin compositions comprising polymer components of poly(lactic acid) and aliphatic polyesters and plasticizer. However in the document, as the natural polymer, starch (obtained from potato, corn, sweet potato, tapioca, and the like), chitin, chitosan, and celluloses are exemplified and as the celluloses, only acetyl cellulose, which is included in the cellulosic ester category, is exemplified and no practical example of adding the celluloses is given. In the cited document, there is no description given that poly(lactic acid) and acetyl cellulose are melting and kneaded to obtain excellent affinity or compatibility and excellent thermostability.

Further, Japanese Patent Application Laid-Open No. 2003-82160 and International application under PCT No. 92/09654 disclose methods of improving the moldability of cellulosic esters by blending aliphatic polyesters such as poly(lactic acid) with the cellulosic esters. However, in the documents, use of the aliphatic polyesters such as poly(lactic acid) as plasticizers for improving the moldability of cellulosic esters with high melt molding temperature is exemplified and there is no description of technical idea that poly(lactic acid) and acetyl cellulose are mixed to improve thermostability of the poly(lactic acid).

On the other hand, as methods of mixing poly(lactic acid) and polymers compatible with poly(lactic acid), Polymer, vol. 39(26), p.6891 (1998) and Micromol. Chem. Phys., vol. 201, p.1295 (2000) disclose addition of poly(methyl methacrylate) having a glass transition temperature about 100° C. for improving the glass transition temperature of the obtained polymer composition and also Japanese Patent Application Laid-Open No. 8-59949 discloses production of polymers excellent in hydrolyzability by mixing a-hydroxycarboxylic acid polymers including poly(lactic acid) and poly(methyl methacrylate) polymers and Japanese Patent Application Laid-Open No. 2002-155207 discloses-that acrylic compounds are added to poly(lactic acid) to obtain resin compositions excellent in weathering resistance and molding processibility and Japanese Patent Application Laid-Open No. 6-322217 discloses production of resin compositions excellent in water-proofness by mixing vinyl alcohol type polymers with polymers containing carbonyl compounds in the main chains, however any one discloses no technical idea relevant to improvement of the thermostability and high temperature rigidity and no implication of means for solution.

It could, therefore, be helpful to provide a poly(lactic acid) polymer composition excellent in the transparency, mechanical properties, and thermostability, a biaxially drawn film, and a molded article.

SUMMARY

We found that a resin composition containing a poly(lactic acid) polymer and a cellulosic ester has excellent compatibility or affinity and excellent thermostability.

That is, we provide a poly(lactic acid) polymer composition containing (A) a poly(lactic acid) polymer with a weight average molecular weight of 50,000 or higher and (B) a cellulosic ester.

Further, we found that a biaxially drawn film containing poly(lactic acid) polymer and at least one compound selected from cellulosic esters, poly(meth)acrylates, and polyvinyl compounds having a glass transition temperature of 60° C. or higher has excellent transparency and thermostability and capable of retaining rigidity at the glass transition temperature of the poly(lactic acid).

That is, we provide a biaxially drawn film containing (A) poly(lactic acid) polymer with a weight average molecular weight of 50,000 or higher and (B) at least one compound selected from cellulosic esters, poly(meth)acrylates, and polyvinyl compounds having a glass transition temperature of 60° C. or higher. From a viewpoint that both of the transparency and thermostability are satisfied, the poly(lactic acid)-containing biaxially drawn film is preferable to have a content of the (B) component in a range of 1% by weight or more and less than 50% by weight in the total content of the (A) component and (B) component.

Practically, the composition is as shown in FIG. 1 and FIG. 2. In FIG. 1 showing the dispersion state of the respective components of the composition of Example 1, no structure is observed and in FIG. 2 showing the dispersion state of the respective components of the composition of Example 3, a regular both continuous phase structure is observed.

BRIEF DESCRIPTION OF THE DRAWINGS

FIG. 3 is a photograph of the sheets of Examples 1, 2, and 3.

Figure 1:
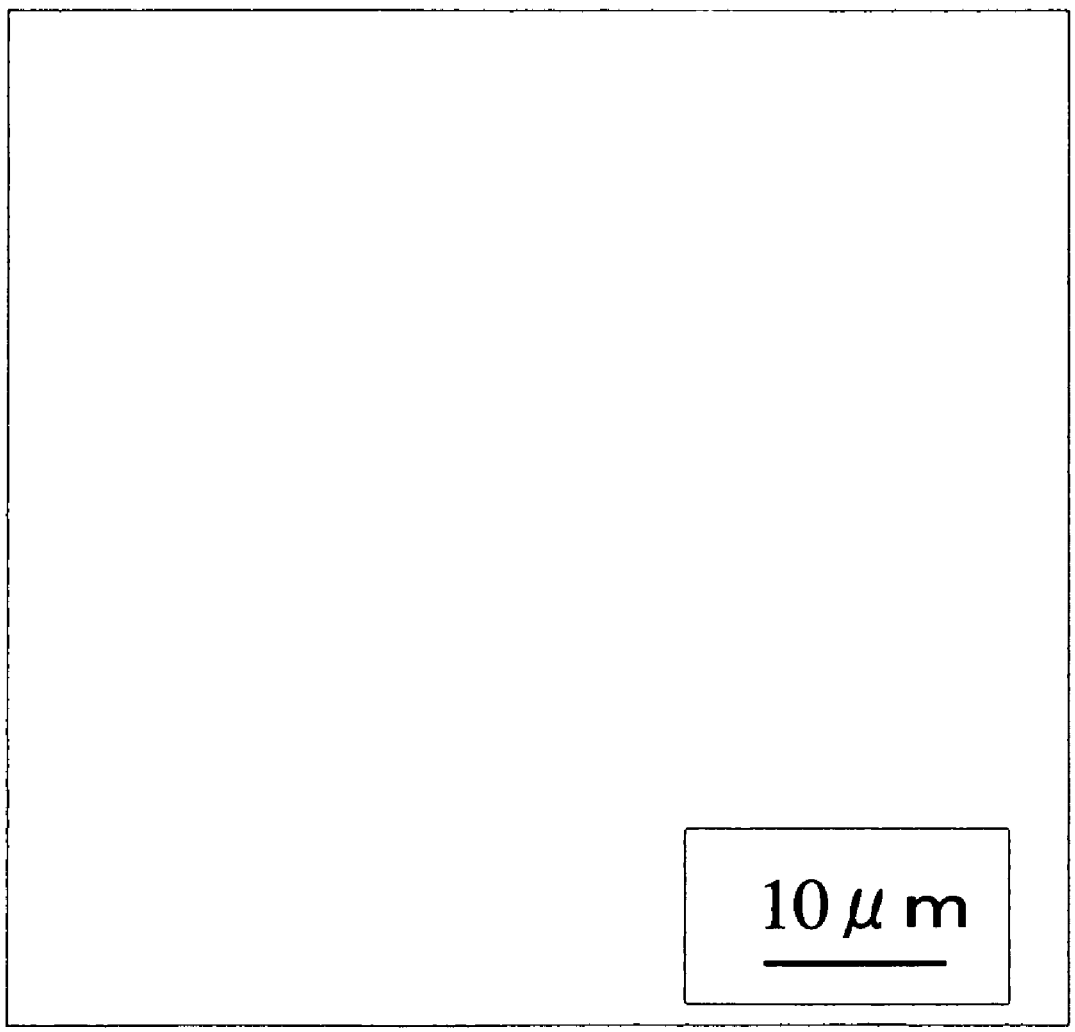
FIG. 1 is a phase-contrast microscopic photograph showing the dispersion state of the respective components of the composition of Example 1.

EXPLANATION OF SYMBOLS 1. (A) poly(lactic acid) polymer composition (PLA-1) with a weight average molecular weight of 50,000;
2. (B) cellulosic ester (CAP-1);
3. a structure cycle by light scattering measurement(=1.1 μm);
4. a photograph of a sheet made of poly(lactic acid) polymer composition of Example 1 (light transmittance (400 nm)=83%);
5. a photograph of a sheet made of poly(lactic acid) polymer composition of Example 2 (light transmittance (400 nm)=68%); and
6. a photograph of a sheet made of poly(lactic acid) polymer composition of Example 3 (light transmittance (400 nm)=52%).

DETAILED DESCRIPTION

A poly(lactic acid) polymer is required to have a weight average molecular weight of 50,000 or higher, preferably 80,000 or higher, and 100,000 or higher, to satisfy practically usable mechanical properties. The weight average molecular weight here means the molecular weight calculated by conversion into poly(methyl methacrylate)(PMMA) measured by gel permeation chromatography.

The poly(lactic acid) polymer is a polymer comprising L-lactic acid and/or D-lactic acid as main components and may contain copolymerizable components other than lactic acid. Examples of other monomer units are glycol compounds such as ethylene glycol, propylene glycol, butanediol, heptandiol, hexanediol, octanediol, nonanediol, decanediol, 1,4-cyclohexanedimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenyl ether dicarboxylic acid, sodium 5-sulfoisophthalate, and 5-tetrabutylphosphonium isophthalate; hydroxycarboxylic acids such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepan-2-one. The copolymerization amount of the above-mentioned other copolymerizable components is preferably 30% by mole or less and more preferably 10% by mole or less in the entire monomer components.

To obtain a resin composition and a biaxially drawn film having particularly high thermostability, it is preferable to use lactic acid components with high optical purity as poly(lactic acid) polymer. It is preferable to contain L-isomer or D-isomer in an amount of 80% or more in the total lactic acid components of the poly(lactic acid) polymer: it is more preferable to contain L-isomer or D-isomer in an amount of 90% or more: and it is even more preferable to contain L-isomer or D-isomer in an amount of 95% or more.

As the production method of the poly(lactic acid) polymer, the known polymerization methods can be employed and a direct polymerization method from lactic acid and a ring-opening polymerization via a lactide can be exemplified.

The melting point of the poly(lactic acid) polymer is not particularly limited. However, it is preferably 120° C. or higher and more preferably 150° C. or higher. The melting point of the poly(lactic acid) polymer is generally increased by heightening the optical purity of the lactic acid component and the poly(lactic acid) polymer with a melting point of 120° C. or higher can be obtained by adjusting the content of L-isomer 90% or higher or D-isomer 90% or higher. The poly(lactic acid) polymer with a melting point of 150° C. or higher can be obtained by adjusting the content of L-isomer 95% or higher or D-isomer 95% or higher.

The cellulosic ester means celluloses whose hydroxyl groups are terminated by an esterification agent. Practical examples of the esterification agent are acid chlorides (e.g. acetyl chloride, propionyl chloride, and the like), acid anhydrides (e.g. acetic anhydride, propionic anhydride, butyric anhydride, and the like), carboxylic acid compounds (e.g. acetic acid, propionic acid, butyric acid, and the like), carboxylic acid compound derivatives (e.g. amide compounds, esterified compounds, and the like), and cyclic esters (e.g. ε-caprolactone).

Practical types of the cellulosic esters are cellulose acetate, cellulose diacetate, cellulose triacetate, cellulose acetate propionate, cellulose acetate butyrate, and cellulose acetate phthalate and in terms of compatibility or affinity, cellulose diacetate, cellulose triacetate, cellulose acetate propionate, cellulose acetate butyrate, and cellulose acetate phthalate are preferable among them and cellulose triacetate and cellulose acetate propionate are more preferable.

The substitution degree of the hydroxyl groups in the celluloses (the average number of the hydroxyl groups substituted by the cellulosic ester) is preferably 0.5 to 2.9 per a glucose unit. In order to provide better compatibility or affinity with the poly (lactic acid), the substitution degree is more preferably 1.8 to 2.9 and even preferably 2.0 to 2.8.

The above-mentioned substitution degree can be calculated by subjecting the esterification agent produced by alkali hydrolysis to quantitative determination by high performance liquid chromatography.

To improve the transparency, which will be described later, it is preferable to add one or more kinds of solvation agents for improving the compatibility of the poly(lactic acid) polymer and cellulosic esters. Preferable examples of such solvation agents are high molecular weight compounds containing organometal compounds and/or methacrylic polymer units by grafting or copolymerization.

As the organometal compounds, an organotitanium compound and an organoaluminum compound are preferable examples. Titanium alkoxides are practical preferable example of the organotitanium compound and the titanium alkoxides can be defined by the general formula $Ti(OR)_m$. In the formula, the reference character m denotes an integer and represents the number of the coordination of alkolates and is generally 1 to 4. The reference character R denotes a group selected from any desirable alkyl groups. R may represent methyl, ethyl, propyl, isopropyl, and butyl and their continuing dimers, trimers, and tetramers. Particularly, titanium tetraisopropoxide, titanium tetrabutoxide, and titanium tetrabutoxide tetramer can be exemplified as preferable examples. Practical examples of the organoaluminum compounds are aluminum alkolates (trialkoxyaluminum), aluminum chelates. Examples of the aluminum alkolates (trialkoxyaluminum) are aluminum isopropylate, mono-sec-butoxyaluminum diisopropylate, and aluminum sec-butylate and examples of the aluminum chelates are ethylacetoacetate aluminum diisopropylate, acetoalkoxyaluminum diisopropylate, aluminum tris(ethylacetoacetate), aluminum tris(acetylacetate), aluminum monoacetylaceonate bis (ethylacetoacetate). Particularly, ethylectoactate aluminum diisopropylate and acetoalkoxyaluminum diisopropylate are preferable and as acetoalkoxyaluminum diisopropylate, Plenact AL-M manufactured by Kawaken Fine Chemicals Co., Ltd. or Ajinomoto Fine Techno Co., Inc. can be exemplified as a preferable example.

The high molecular weight compounds containing methacrylic polymer units by grafting or copolymerization may include those which contain at least one or more methacrylic polymer units as branched chains by graft-copolymerization and those which contain at least one or more methacrylic polymer units in the main chains by block-copolymerization. In terms of availability in markets, the high molecular weight compounds containing at least one or more methacrylic polymer units as branched chains by graft-copolymerization are preferable and in this case, polyolefins polystyrenes, and acrylic resins can be exemplified as the polymers to be the main chains.

The polyolefins may include homopolymers, random or block copolymers of α-olefins such as ethylene, propylene, but-1-ene, pent-1-ene, hex-1-ene, 3-methylbut-1-ene, 4-methylpent-1-ene, hept-1-ene, and oct-1-ene; and random, block or grafted copolymers of at least a half by weight of α-olefins and other unsaturated monomers. Examples to be used as the above-mentioned other unsaturated monomers are unsaturated organic acids and their derivatives such as acrylic acid, methacrylic acid, maleic acid, itaconic acid, methyl acrylate, ethyl acrylate, methyl methacrylate, maleic anhydride, glycidylmethacrylic acid, arylmaleic acid imide, and alkylmaleic acid imide; vinyl esters such as vinyl acetate and vinyl butyrate; aromatic vinyl compounds such as styrene and methylstyrene; vinylsilanes such as vinyltrimethylmethoxylsilane and γ-methacryloyloxypropyltrimethoxysilane; and non-conjugated dienes such as dicyclopentadiene and 4-ethylidene-2-norbornene. In the case of copolymers, the copolymers may comprise a plurality of kinds of α-olefins and other monomers without a restriction of only two kinds.

The polystyrenes include homopolymers and random and block copolymers of styrene type monomers such as styrene, methylstyrene, glycidyl-substituted styrene; and random, block, and graft copolymerized polymers of at least a half by weight of the these compounds and other unsaturated monomers. Examples to be used as the unsaturated monomers here are unsaturated organic acids and their derivatives such as acrylic acid, methacrylic acid, maleic acid, itaconic acid, methyl acrylate, ethyl acrylate, methyl methacrylate, maleic anhydride, glycidylmethacrylic acid, arylmaleic acid imide, and alkylmaleic acid imide; vinyl esters such as vinyl acetate and vinyl butyrate; vinylsilanes such as vinyltrimethylmethoxylsilane and γ-methacryloyloxypropyltrimethoxysilane; and non-conjugated dienes such as dicyclopentadiene and 4-ethylidene-2-norbornene. In the case of copolymers, the copolymers may comprise a plurality of kinds of styrene type monomers and other monomers without a restriction of only two kinds.

Further, the acrylic resins include homopolymers and random and block copolymers of acrylic resin monomers such as acrylic acid, methacrylic acid, methyl acrylate, ethyl acrylate, methyl methacrylate, and glycidyl methacrylic acid; and random, block, and graft copolymerized polymers of at least a half by weight of the these compounds and other unsaturated monomers. Examples to be used as the unsaturated monomers here are unsaturated organic acids and their derivatives such as maleic acid, itaconic acid, maleic anhydride, arylmaleic acid imide, alkylmaleic acid imide, styrene, methylstyrene; glycidyl-substituted styrene; vinylsilanes such as vinyl acetate; and non-conjugated dienes such as dicyclopentadiene and 4-ethylidene-2-norbornene. In the case of copolymers, the copolymers may comprise a plurality of kinds of monomers of acrylic type polymers and other monomers without a restriction of only two kinds.

The methacrylic resins to be introduced by grafting or copolymerization are those obtained by polymerizing methyl methacrylate alone or mixtures of methyl methacrylate and other copolymerizable vinyl or vinylidene type monomers and preferably contain 80% by weight or more methyl methacrylate. Examples of the above-mentioned other copolymerizable vinyl or vinylidene type monomers are acrylic acid esters with alkyl having 1 to 8 carbons such as methyl acrylate, ethyl acrylate, butyl acrylate, and 2-ethylhexyl acrylate; styrene, and acrylonitrile. Not only one kind methacrylic resin but also two or more methacrylic resins may be introduced.

Practical examples of the high molecular weight compounds obtained by modification of methacrylic resins by grafting or copolymerization are polyethylene-g-poly(methyl methacrylate) (PE-g-PMMA) ("g" means graft, hereinafter the same), polypropylene-g-poly(methyl methacrylate) (PP-g-PMMA), poly(ethylene/propylene)-g-poly(methyl methacrylate) (EPM-g-PMMA), poly(ethylene/ethyl acrylate)-g-poly(methyl methacrylate) (EEA-g-PMMA), poly(ethylene/vinyl acetate)-g-poly(methyl methacrylate) (EVA-g-PMMA), poly(ethylene/ethyl acrylate/maleic anhydride)-g-poly(methyl methacrylate) (E/EA/MAH-g-PMMA), poly(ethylene/glycidyl methacrylate)-g-poly(methyl methacrylate) (EGMA-g-PMMA), and poly(ethyl acrylate/glycidyl methacrylate)-g-poly(methyl methacrylate) (EA/GMA-g-PMMA) and particularly preferable examples are poly(ethylene/ethyl acrylate/maleic anhydride)-g-poly(methyl methacrylate) (E/EA/MAH-g-PMMA) and poly(ethylene/glycidyl methacrylate)-g-poly(methyl methacrylate) (EGMA-g-PMMA).

The poly(lactic acid) polymer composition can be produced by producing a composition by evenly mixing solutions obtained by dissolving the respective components in solvents and then removing the solvents, however a melt kneading method, which is a practical production method, requiring no dissolution of raw materials in solvents and removal of the solvents is preferable to be employed. The melt kneading method is a production method involving melting and kneading the respective components. The melt kneading method is not particularly limited and conventionally known mixing apparatuses which are used commonly, such as a kneader, a roll mill, a Banbury mixer, and an uniaxial or biaxial extruder may be used. In terms of the productivity, the uniaxial or biaxial extruder is preferable to be used among them. The mixing order is not particularly limited and for example, a method involving dry blending the poly(lactic acid) and the cellulosic ester and then supplying the blended mixture to the melt kneader; and a method of previously producing a master batch by melting and kneading the poly (lactic acid) and the cellulosic ester and then melt-kneading the poly(lactic acid) with the master batch can be exemplified. Further, based on the necessity, a method of melting and kneading other additives simultaneously and a method of previously producing a master batch by melting and kneading the poly(lactic acid) and the cellulosic ester and then melt-kneading the poly(lactic acid) and the cellulosic ester with the master batch may be employed. The temperature at the time of melt-kneading is preferably in a range from 190° C. to 240° C. and to prevent deterioration of the poly(lactic acid), it is more preferably in a range from 200° C. to 220° C.

Since the poly(lactic acid) polymer composition produced through the melt-kneading is excellent in compatibility or affinity, the composition is excellent in the transparency and in the case the poly(lactic acid) polymer composition is formed into a 0.2 mm-thick sheet, it is made possible to obtain a sheet with a luminous transmittance 40% or higher for visible light rays generally with wavelength 400 nm. Further, in a preferable embodiment, it is made possible to obtain a sheet having a luminous transmittance 50% or higher for visible light rays generally with wavelength 400 nm. In a more preferable embodiment, it is made possible to obtain a sheet having a luminous transmittance 60% or higher for visible light rays generally with wavelength 400 nm.

The poly(lactic acid) polymer composition is excellent in compatibility or affinity and may possibly have a solvation structure of the poly(lactic acid) polymer composition and the cellulosic ester and/or a phase structure with 0.01 μm or smaller depending on the type and the addition amount of the cellulosic ester added and in this case, the composition is particularly excellent in transparency and is therefore preferably suitable for various transparent uses. Here, solvation means that both components are evenly mixed in molecular level. Concretely, it means that neither one of the phases of different main components of a two-component polymer forms phase structure of 0.001 μm or larger. Non-solvation means the case of no solvation state, in other word, it means that the phases of different main components of a two-component polymer form phase structure of 0.001 μm or larger. Whether solvation is caused or not can be judged by an electron microscope, a differential scanning calorimetry (DSC), and other various methods as described in "Polymer Alloy and Polymer Blend"(L. A. Utracki, translated by Toshio Nishi, Tokyo Kagaku Dojin, p. 111, 1991). As the most general method for solvation determination is a method for the judgment by the glass transition temperature. In the case solvation is caused, the glass transition temperature changes more than that of each component alone and in many cases, a single glass transition temperature appears. As a measurement method of the glass transition temperature, both of a method of measurement by DSC and a method of measurement by a dynamic viscoelasticity test may be employed.

With respect to the poly(lactic acid) polymer composition, depending on the types and the mixing amount of the cellulosic ester, the poly(lactic acid) polymer composition and the cellulosic ester may possibly have a both continuous phase structure with structure of 0.01 to 3 μm or a dispersion structure of 0.01 to 3 μm inter-particle distance and in these cases are also preferable since the mechanical property and the thermostability are both satisfied. It is supposed that these both continuous phase structure and dispersion structure are formed by phase separation by Spinodal decomposition after solvation once occurs at the time of melt-kneading, however it is not limited to that. To confirm these continuous phase structure and dispersion structure, for example, formation of the both continuous phase structure can be confirmed by optical microscopic observation and transmittance electron microscopic observation and it can be confirmed based on the appearance of scattering maximum peak in the scattering measurement carried out by a light scattering apparatus or a small angle x-ray scattering apparatus. In this connection, since the light scattering apparatus and the small angle x-ray scattering apparatus differ the optimum measurement ranges, they may be used properly based on the structural period. The presence of the scattering maximum peak in the scattering measurement proves the polymer composition has a regular phase separation structure with a certain period and the period Λm corresponds to the structural period in the case of the both continuous phase structure and to the inter-particle distance in the case of the dispersion structure. The value can be calculated from the following equation: $\Lambda m = (\lambda/2)/\sin(\theta m/2)$ wherein λ represents the wavelength in the scattering body of the scattered light and θm represents the scattering angle giving the maximum scattering peak.

The poly(lactic acid) polymer composition and the composition mixing amount in the poly(lactic acid) biaxially drawn film are not particularly limited, however it is effective to improve the characteristics of the poly(lactic acid) and particularly effective to improve the transparency and mechanical properties and thermostability of the poly(lactic acid) in the case the poly(lactic acid) polymer is contained in an amount of 99 part by weight or less and exceeding 50 part by weight and the (B) component in an amount of 1 part by weight or more and less than 50 part by weight when the total of the poly(lactic acid) and the (B) component is set to be 100 part by weight. In terms of further improvement of the above-mentioned properties, it is more preferable that the poly(lactic acid) polymer is in an amount of 90 part by weight or less and exceeding 60 part by weight and the (B) component in an amount of 10 part by weight or more and less than 40 part by weight and it is even more preferable that the poly(lactic acid) polymer is in an amount of 85 part by weight or less and exceeding 65 part by weight and the (B) component in an amount of 15 part by weight or more and less than 35 part by weight.

One of the methods for specifying the precise addition amount is specification by NMR. For example, to specify the addition amounts of the poly(lactic acid) and poly(methyl methacrylate), the amounts can be measured by carrying out 1H-NMR measurement in a chloroform deuteride solvent at 55° C. and carrying out calculation from the intensity ratio of the peak derived from the poly(lactic acid) (e.g. the peak derived from methine group) and the peak derived from poly (methyl methacrylate) (e.g. the derived from the methoxy group). In the case the 1H-nuclei peaks are overlaid to make the calculation impossible, further 13C-NMR measurement is carried out to specify the amounts.

The poly(lactic acid) polymer composition may contain organic fillers derived from natural substances. The organic fillers derived from natural substances are not particularly limited and may be natural substances and preferably those which contain cellulose.

Examples of the organic fillers derived from natural substances are chip-like materials such as rice husk, wood chips, tofu refuse, crushed wastepaper materials and torn clothes; fibrous materials including plants fibers such as cotton fibers, hemp fibers, bamboo fibers, wood fibers, kenaf fibers, jute fibers, banana fibers, coconut fibers; pulp and cellulose fibers obtained by processing the plant fibers and animal fibers such as silk, wool, angora, cashmere, and camel; and powder-like materials such as paper powder, wood powder, bamboo powder, cellulose powder, rice husk powder, fruit shell powder, chitin powder, chitosan powder, proteins, and starch powder and in terms of moldability, powder-like materials such as paper powder, wood powder, bamboo powder, cellulose powder, rice husk powder, fruit shell powder, chitin powder, chitosan powder, proteins, and starch powder and hemp fibers, kenaf fibers, and jute fibers are preferable; paper powder, wood powder, bamboo powder, cellulose powder, kenaf fibers are more preferable; paper powder, wood powder, and kenaf fibers are furthermore preferable; and paper powder is even more preferable. These natural organic fillers may be those collected directly from natural materials and in terms of the protection of global environments and preservation of natural resources, wastes such as wastepaper, waste wood, and used clothes may be recycled.

The wastepaper means newspaper, magazines, and other regenerated pulp or board paper such as corrugated cardboards, cardboards, and paper tubes and those which are obtained by processing plant fibers as raw materials and any of the exemplified materials may be used, however in terms of moldability, crushes products of newspaper and board paper such as corrugated cardboards, cardboards, and paper tubes are preferable.

Practical examples of the wood materials to be used for wood paper are needle-leaf trees such as pine tree, Japanese cedar, Japanese cypress, and fir tree and broadleaf trees such as Japanese beech, chinquapin, and eucalyptus and are not limited to the types. Examples of the paper powder are not particularly limited and in terms of the moldability, it is preferable to contain an adhesive. The adhesive is not particularly limited if it is used commonly at the time of processing paper and examples are emulsion type adhesives such as vinyl acetate resin type emulsions and acrylic resin type emulsions; poly(vinyl alcohol) type adhesives, cellulose type adhesives, natural rubber type adhesives, starch glue; and hot melt adhesives such as ethylene-vinyl acetate copolymer resin type adhesives and polyamide type adhesives. Among them, emulsion type adhesives, poly(vinyl alcohol) type adhesives, and hot melt adhesives are preferable and emulsion type adhesives and poly(vinyl alcohol) type adhesives are more preferable. These adhesives are also usable as binders for paper processing agents. The adhesives are preferable to contain inorganic fillers such as clay, bentonite, talc, kaolin, montmorillonite, mica, synthetic mica, zeolite, silica, graphite, carbon black, magnesium oxide, calcium oxide, titanium oxide, calcium sulfide, magnesium carbonate, calcium carbonate, barium carbonate, barium sulfate, aluminum oxide, and neodymium oxide and they are more preferable to contain clay, bentonite, talc, kaolin, montmorillonite, synthetic mica, and silica.

Further, in terms of the moldability, paper powder is preferable to have ash component 5% by weight or higher, more preferably 5.5% by weight or higher, and even more preferably 8% by weight or higher. Although the upper limit is not particularly limited, it is preferably 60% by weight and more preferably 30% by weight. Herein, the ash component means the ratio of the weight of ashes remaining after firing an organic filler 10 g at a high temperature, e.g. 450° C. or higher, for 8 hours to the weight of the paper powder before firing.

Further, as the paper powder, those which contain an inorganic compound 5 to 20% by weight in paper powder are preferable and those which contain aluminum, silicon, and calcium as an inorganic element are more preferable and those which contain aluminum, silicon, calcium, and sulfur as an inorganic element are more preferable and those which contain aluminum, silicon, calcium, sulfur and magnesium as an inorganic element are furthermore preferable and those which contain-aluminum in a content as high as two times to that of magnesium are even more preferable.

The weight ratios of aluminum, silicon, calcium, sulfur and magnesium are not particularly limited, however it is preferable that aluminum 1 to 60% by mole, silicon 20 to 90% by mole, calcium 1 to 30% by mole, sulfur 1 to 20% by mole, and magnesium 0 to 20% by mole in the case the total of the elements is set to be 100; it is more preferable that aluminum 10 to 55% by mole, silicon 20 to 85% by mole, calcium 1 to 25% by mole, sulfur 1 to 15% by mole, and magnesium 0 to 10% by mole; and it is even more preferable that aluminum 20 to 50% by mole, silicon 25 to 80% by mole, calcium 3 to 20% by mole, sulfur 2 to 10% by mole, and magnesium 0 to 8% by mole. Elementary analysis of them may be carried out for single substance of the natural material-derived organic filler and ashes of the natural material-derived organic filler and ashes are employed. The elementary analysis can be carried out by using apparatuses for fluorescent x-ray analysis, atomic absorptiometry, and scanning electron microscope (SEM) or transmission electron microscope (TEM) in combination with energy dispersion type x-ray microanalyzer (XMA) and in this example, fluorescent x-ray analysis is employed.

As the paper powder, in terms of moldability, it is preferable to contain cellulose bearing fine particles on the surface. The fine particles are not particularly limited and may be inorganic filler contained in the above-mentioned adhesives or organic matters or other inorganic matters, however the particles are preferable to contain silicon and aluminum. The shape of the fine particles may be a needle-like, plate-like or spherical shape. The size of the fine particles is not particularly limited, however it is preferable to be distributed in a range of 0.1 to 5000 nm, more preferably 0.3 to 1000 nm, furthermore preferably 0.5 to 500 nm, even more preferably 1 to 100 nm, and most preferably 1 to 80 nm. That to be distributed in specified range means that 80% or more of the total number of the fine particles are within the specified range. The adhesion state of the fine particles may be in state of agglomeration or dispersion. However, they are more preferable to be deposited in the dispersion state. The size of the fine particles can be observed by observing a molded article obtained from a resin composition containing a natural resin and a natural organic filler with a transmission electron microscope at 80,000 magnification and the total number of fine particles to be observed is set to be randomly 100 pieces.

With respect to other natural organic fillers other than the paper powder, it is preferable to select and use those having the above-mentioned characteristics, that is ash amount and composition and those bearing the fine particles.

Fillers (e.g. glass fiber, carbon fiber, other organic fibers, ceramic fiber, ceramic bead, asbestos, wallastonite, talc, clay, mica, sericite, zeolite, bentonite, dolomite, kaolin, finely powdered silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite, and white clay); stabilizers (e.g. an antioxidant and an ultraviolet ray absorbent), lubricants, release agents, fire-retarding agents, coloring agents including dyes and pigments, and nucleating agents can be added without departing from the spirit and scope of our disclosure.

At least one or more kinds of other thermoplastic resins (e.g. polyacetal, ployethylenes, polypropylenes, polyamides, polyphenylene sulfide resins, polyether ether ketone resins, polyesters, polysulfones, polyphenylene oxides, polyimides, and polyether imides), thermosetting resins (e.g. phenyl resins, melamine resins, polyester resins, silicone resins, and epoxy resins), and soft thermoplastic resins (e.g. polyester elastomers, polyamide elastomers, ethylene/propylene tarpolymers, ethylene/but-1-ene copolymers) can be added without departing from the spirit and scope of our compositions.

Since the resin composition is excellent in compatibility or affinity and can be melt-kneaded, it can be used by being processed into various molded articles by injection molding or extrusion molding. Examples of the molded articles are injection-molded articles, extrusion-molded articles, blow-molded articles, films, fibers and sheets. As the films, various films such as un-drawn, uniaxially drawn, and biaxially drawn films and inflation films can be used and as fibers, various kinds of fibers such as unstretched yarns, stretched yarns, and ultra stretched yarns can be used. These articles may be used in a wide range of uses such as electric and electronic parts, construction member, automotive parts, and daily goods.

We found that a biaxially drawn film containing poly(lactic acid) polymer and at least one compounds selected from cellulosic esters, poly(meth)acrylates, and polyvinyl compounds having a glass transition temperature of 60° C. or higher has excellent thermostability and capability of retaining the rigidity at the glass transition temperature of the poly(lactic acid) and thus disclose it herein.

The cellulosic ester to be used use for the biaxially drawn film means celluloses whose hydroxyl groups are terminated by an esterification agent. Herein, the termination means forming ester bonds by chemical bonding of the hydroxyl groups and an esterification agent. To maintain high thermostability, it is preferable to use an esterification agent having 1 to 10 carbon atoms. Practical examples of the esterification agent are acid chlorides (e.g. acetyl chloride, propionyl chloride, and the like), acid anhydrides (e.g. acetic anhydride, propionic anhydride, butyric anhydride, and the like), carboxylic acid compounds (e.g. acetic acid, propionic acid, butyric acid, and the like), carboxylic acid compound derivatives (e.g. amide compounds, esterified compounds, and the like), and cyclic esters (e.g. $\epsilon$-caprolactone).

Practical types of the cellulosic ester are cellulose acetate, cellulose diacetate, cellulose triacetate, cellulose acetate propionate, cellulose acetate butyrate, and cellulose acetate phthalate and in terms of compatibility or affinity, cellulose diacetate, cellulose triacetate, cellulose acetate propionate, cellulose acetate butyrate, and cellulose acetate phthalate are preferable among them and cellulose triacetate and cellulose acetate propionate are more preferable.

The substitution degree of the hydroxyl groups in the celluloses (the average number of the hydroxyl groups substituted by the cellulosic ester) is preferably 0.5 to 2.9 per a glucose unit. In order to provide better compatibility or affinity with the poly(lactic acid), the substitution degree is more preferably 1.8 to 2.9 and even preferably 2.0. to 2.8.

The above-mentioned substitution degree can be calculated by subjecting the esterification agent produced by alkali hydrolysis to quantitative determination by high performance liquid chromatography.

The poly(meth)acrylate means those which comprise at least one monomer selected from acrylates and methacrylates and may include copolymers of two or more kinds of monomers. The acrylates and methacrylates to compose the poly (meth)acrylate are, for example, acrylates such as methyl acrylate, ethyl acrylate, n-propyl acrylate, n-butyl acrylate, cyanoethyl acrylate, and cyanobutyl acrylate, and methacrylates such as methyl methacrylate, ethyl methacrylate, cyclohexyl methacrylate, and 2-hydroxyethyl methacrylate and poly(methyl methacrylate) is preferable to be used for providing higher high temperature rigidity.

The poly(meth)acrylate is preferably has a weight average molecular weight of 20000 to 500000 and more preferable to have the weight average molecular weight of 100000 to 200000. If the weight average molecular weight is less than 20000, the strength of the molded article is sometimes deteriorated and if the weight average molecular weight exceeds 500000, the fluidity at the time of molding is sometimes decreased.

A method of polymerizing or copolymerizing these monomers is not particularly limited and a conventionally known polymerization method such as bulk polymerization, solution polymerization, and suspension polymerization can be employed.

The polyvinyl compound include polymers of vinyl compounds and among them, it is required to use compounds having a glass transition temperature of 60° C. or higher. If the glass transition temperature is lower than 60° C., the effect to improve the thermostability of the poly(lactic acid) is lowered even if the solvation with the poly(lactic acid) is caused and therefore, it is not preferable. Practical examples of the polyvinyl compounds having a glass transition temperature of 60° C. or higher, various kinds of styrene polymers such as polystyrene, poly(4-acetylstyrene), poly(2-methylstyrene), poly (3-methylstyrene), poly(4-methylstyrene), poly(4-methoxystyrene), poly(4-hydroxystyrene) (polyvinyl phenol), poly(2-hydroxymethylstyrene), poly(3-hydroxymethylstyrene), and poly(4-hydroxymethylstyrene); and poly(benzoyloxyethylene), poly(cyclohexanoyloxyethylene), poly(4-ethoxybenzoyloxyethylene), poly(2-methoxybenzoyloxyethylene), poly(4methoxybenzoyloxyethylene), and poly(4-phenylbenzoyloxyethylene) and in terms of the affinity with the poly (lactic acid) polymer, poly(4-hydroxystyrene) (polyvinyl phenol) is preferable to be used.

The poly(lactic acid) film is required to be a biaxially drawn film drawn in both directions, the longitudinal direction and the width direction, in terms of the thermostability. In the case a film other than the biaxially drawn film is used at a glass transition temperature of the poly(lactic acid), thermal deformation or thermal crystallization takes place and it is not desirable in terms of the quality stability.

To further improve the transparency, which will be described later, it is preferable to add one or more kinds of solvation agents for improving the affinity of the poly(lactic acid) polymer composition with the cellulosic ester and/or poly(meth)acrylate and/or the polyvinyl compound (hereinafter, referred to as an alloying component). Examples preferable for the solvation agent are high molecular weight compounds containing organometal compounds and/or (meth) acrylic polymer units by grafting or copolymerization.

As the organometal compounds, an organotitanium compound and an organoaluminum compound are preferable examples. Titanium alkoxides are practical preferable example of the organotitanium compound and the titanium alkoxides can be defined by the general formula $Ti(OR)_m$. In the formula, the reference character m denotes an integer and represents the number of the coordination of alkolates and is generally 1 to 4. The reference character R denotes a group selected from any desirable alkyl groups. R may represent methyl, ethyl, propyl, isopropyl., and butyl and their continuing dimers, trimers, and tetramers. Particularly, titanium tetraisopropoxide, titanium tetrabutoxide, and titanium tetrabutoxide tetramer can be exemplified as preferable examples. Practical examples of the organoaluminum compounds are aluminum alkolates (trialkoxyaluminum), aluminum chelates. Examples of the aluminum alkolates (trialkoxyaluminum) are aluminum isopropylate, mono-sec-butoxyaluminum diisopropylate, and aluminum sec-butylate and examples of the aluminum chelates are ethylacetoacetate aluminum diisopropylate, acetoalkoxyaluminum diisopropylate, aluminum tris(ethylacetoacetate), aluminum tris(acetylacetate), aluminum monoacetylaceonate bis (ethylacetoacetate). Particularly, ethylacetoacetate aluminum diisopropylate and. acetoalkoxyaluminum diisopropylate are preferable and as acetoalkoxyaluminum diisopropylate, Plenact AL-M manufactured by Kawaken Fine Chemicals Co., Ltd. or Ajinomoto Fine Techno Co., Inc. can be exemplified as a preferable example.

The high molecular weight compounds containing methacrylic polymer units by grafting or copolymerization may include those which contain at least one or more methacrylic polymer units as branched chains by graft-copolymerization and those which contain at least one or more methacrylic polymer units in the main chains by block-copolymerization. In terms of availability in markets, the high molecular weight compounds containing at least one or more methacrylic polymer units as branched chains by graft-copolymerization are preferable and in this case, polyolefins, polystyrenes, and acrylic resins can be exemplified as the polymers to be the main chains.

The polyolefins may include homopolymers, random or block copolymers of α-olefins such as ethylene, propylene, but-1-ene, pent-1-ene, hex-1-ene, 3-methylbut-1-ene, 4-methylpent-1-ene, hept-1-ene, and oct-1-ene; and random, block or grafted copolymers of at least a half by weight of α-olefins and other unsaturated monomers. Examples to be used as the above-mentioned other unsaturated monomers are unsaturated organic acids and their derivatives such as acrylic acid, methacrylic acid, maleic acid, itaconic acid, methyl acrylate, ethyl acrylate, methyl methacrylate, maleic anhydride, glycidylmethacrylic acid, arylmaleic acid imide, and alkylmaleic acid imide; vinyl esters such as vinyl acetate and vinyl butyrate; aromatic vinyl compounds such as styrene and methylstyrene; vinylsilanes such as vinyltrimethylmethoxylsilane and γ-methacryloyloxypropyltrimethoxysilane; and non-conjugated dienes such as dicyclopentadiene and 4-ethylidene-2-norbornene. In the case of copolymers, the copolymers may comprise a plurality of kinds of α-olefins and other monomers without a restriction of only two kinds.

The polystyrenes include homopolymers and random and block copolymers of styrene type monomers such as styrene, methylstyrene, glycidyl-substituted styrene; and random, block, and graft copolymerized polymers of at least a half by weight of the these compounds and other unsaturated monomers. Examples to be used as the unsaturated monomers here are unsaturated organic acids and their derivatives such as acrylic acid, methacrylic acid, maleic acid, itaconic acid, methyl acrylate, ethyl acrylate, methyl methacrylate, maleic anhydride, glycidylmethacrylic acid, arylmaleic acid imide, and alkylmaleic acid imide; vinyl esters such as vinyl acetate and vinyl butyrate; vinylsilanes such as vinyltrimethylmethoxylsilane and γ-methacryloyloxypropyltrimethoxysilane; and non-conjugated dienes such as dicyclopentadiene and 4-ethylidene-2-norbornene. In the case of copolymers, the copolymers may comprise a plurality of kinds of styrene type monomers and other monomers without a restriction of only two kinds.

Further, the acrylic resins include homopolymers and random and block copolymers of acrylic resin monomers such as acrylic acid, methacrylic acid, methyl acrylate, ethyl acrylate, methyl methacrylate and glycidyl methacrylic acid; and random, block, and graft copolymerized polymers of at least a half by weight of the these compounds and other unsaturated monomers. Examples to be used as the unsaturated monomers here are unsaturated organic acids and their derivatives such as maleic acid, itaconic acid, maleic anhydride, arylmaleic acid imide, alkylmaleic acid imide, styrene, methylstyrene; glycidyl-substituted styrene; vinylsilanes such as vinylsilane; and non-conjugated dienes such as dicyclopentadiene and 4-ethylidene-2-norbornene. In the case of copolymers, the copolymers may comprise a plurality of kinds of monomers of acrylic type polymers and other monomers without a restriction of only two kinds.

The methacrylic resins to be introduced by grafting or copolymerization are those obtained by polymerizing methyl methacrylate alone or mixtures of methyl methacrylate and other copblymerizable vinyl or vinylidene type monomers and preferably contain 80% by weight or more methyl methacrylate. Examples of the above-mentioned other copolymerizable vinyl or vinylidene type monomers are acrylic acid esters with alkyl, having 1 to 8 carbons such as methyl acrylate, ethyl acrylate, butyl acrylate, and 2-ethylhexyl acrylate; styrene, and acrylonitrile. Not only one kind methacrylic resin but also two or more methacrylic resins may be introduced.

Practical examples of the high molecular weight compounds obtained by modification of methacrylic resins by grafting or copolymerization are polyethylene-g-poly(methyl methacrylate) (PE-g-PMMA) ("g" means graft, hereinafter the same), polypropylene-g-poly(methyl methacrylate) (PP-g-PMMA), poly(ethylene/propylene)-g-poly(methyl methacrylate) (EPM-g-PMMA), poly(ethylene/ethyl acrylate)-g-poly(methyl methacrylate) (EEA-g-PMMA), poly (ethylene/vinyl acetate)-g-poly(methyl methacrylate) (EVA-g-PMMA), poly(ethylene/ethyl acrylate/maleic anhydride)-g-poly (methyl methacrylate) (E/EA/MAH-g-PMMA), poly (ethylene/glycidyl methacrylate)-g-poly(methyl methacrylate) (EGMA-g-PMMA), and poly(ethyl acrylate/ glycidyl methacrylate)-g-poly(methyl methacrylate) (EA/GMA-g-PMMA) and particularly preferable examples are poly(ethylene/ethyl acrylate/maleic anhydride)-g-poly(methyl methacrylate) (E/EA/MAH-g-PMMA) and poly(ethylene/glycidyl methacrylate)-g-poly(methyl methacrylate) (EGMA-g-PMMA).

The poly(lactic acid) biaxially drawn film can be produced by evenly mixing solutions obtained by dissolving the respective components in solvents and removing the solvents, and then carrying out film formation, however a melt kneading method, which is a practical production method, requiring no dissolution of raw materials in solvents and removal of the solvents is preferable to be employed. The melt kneading method is a production method involving melting and kneading the respective components. The melt film formation method is not particularly limited and methods involving obtaining a resin composition using a conventionally known mixing apparatuses which are used commonly, such as a kneader, a roll mill, a Banbury mixer, and an uniaxial or biaxial extruder, and then leading the melted and mixed resin composition to a slit-like mouth cap, extruding the resin composition in a sheet-like form on a cooling casting drum, and obtaining a sheet by a T-die method or a touch roll casting method. Among them, in terms of the productivity, it is preferable to form a sheet by using a uniaxial or biaxial extruder. The mixing order of the polymer is not particularly limited and for example, a method involving dry blending the poly(lactic acid) and the alloying component and then, supplying the blended mixture to the melt kneader; and a method of previously producing a master batch by melting and kneading the poly(lactic acid) and the alloying component and then melt-kneading the poly(lactic acid) with the master batch can be exemplified. Further, based on the necessity, a method of melting and kneading other additives simultaneously and a method of previously producing a master batch by melting and kneading the poly(lactic acid) and other additives and then melt-kneading the poly(lactic acid) and the alloying component with the master batch may be employed. The temperature at the time of melt-kneading is preferably in a range from 190° C. to 240° C. and to prevent deterioration of the poly(lactic acid), it is more preferably in a range from 200° C. to 220° C.

In terms of the thermostability, the degree of the crystallinity of the poly(lactic acid) biaxially drawn film is preferably 50% or higher and more preferably 60%. The upper limit of the degree of the crystallinity is not particularly limited, however it is preferably 90% or lower. The measurement of the degree of the crystallinity may be carried out by any conventionally known measurement method such as a density method, a DSC method, and an x-ray deflection method and in the case of analyzing with x-rays, the measurement is carried out by separating crystal regions and non-crystal regions different from each other in the scattering of x-rays, measuring the integrated intensity of the respective regions, and carrying out calculation from the measurement results. A method of achieving the degree of the crystallinity is not particularly limited. However, as a method to be employed preferably, thermal treatment to be carried out after film formation can be exemplified. Such thermal treatment may be carried out at an optional temperature not higher than the melting point of the poly(lactic acid) polymer composition and preferably 80 to 150° C. and even more preferably 100 to 150° C. The thermal treatment may be carried out while the film being loosened in the longitudinal direction and/or the width direction.

The poly(lactic acid) biaxially drawn film is excellent in transparency and film haze is preferably 10% or lower, more preferably 7% or lower, and even more preferably 5% or lower. Herein, the film haze is a value calculated by conversion into a 10 μm-thick film to the basis of the haze value of a film sample whose thickness is previously measured; It is preferable that the value is 10% or lower even in the actually measured value before the conversion.

The glass transition temperature of the poly(lactic acid) is about 60° C. and if it exceeds 60° C., the modulus of elasticity tends to be decreased, however the biaxially drawn film has a modulus of elasticity increasing at the glass transition temperature or higher and the thermal deformation in the case of use at the glass transition temperature or higher is hard to occur and in such a manner that the thermostability and rigidity at a high temperature are remarkably improved. From this viewpoint, the poly(lactic acid) biaxially drawn film preferably has a modulus of elasticity of 300 MPa or higher, more preferably 500 MPa or higher, and even more preferably 700 MPa at 80° C.

The poly(lactic acid) biaxially drawn film may contain various kinds of particles in accordance with purposes and uses. The particles to be added are not particularly limited without departing from the spirit and scope of this disclosure and inorganic particles, organic particles, crosslinked high molecular weight particles, and inner particles to be produced in the polymerization system. Two or more types of these particles may be added in combination. In terms of the mechanical properties of the poly(lactic acid) film, the addition amount of the particles is preferably 0.01 to 10% by weight and even more preferably 0.02 to 1% by weight.

The poly(lactic acid) biaxially drawn film may contain a proper amount of additives such as flame retardants, heat stabilizers, antioxidants, ultraviolet absorbents, antistatic agents, plasticizers, tackifiers, fatty acid esters, organic lubricants such as waxes, defoaming agents such as polysiloxanes, and coloring agents such as pigments and dyes in accordance with necessity without departing from the spirit and scope of the disclosure.

Further, the film may further contain at least one kind of resins, for example, thermoplastic resins such as polyacetals, polyethylenes, polypropylenes, acrylic resins, polyamides, polyphenylene sulfide resins, polyether ether ketone resins, polyesters, polysulfones, polyphenylene oxides, polyimides, and polyether imides; themosetting resins such as phenol resins, melamine resins, polyester resins, silicone resins, and epoxy resins; and soft thermoplastic resins such as ethylene/glycidyl methacrylate copolymers, polyester elastomers, polyamide elastomers, ethylene/propylene tarpolymers, ethylene/but-1-ene copolymers.

The film structure may be a monolayer and a layered structure for providing a new function of easy slipping property, adhesive property, pressure-sensitive adhesive property, thermostability, and weathering resistance to the surface. For example, in the case a B layer and a C layer having different compositions of the resins or the additives are layered on an A layer containing poly(lactic acid) polymer and the alloying component, A/B two-layer structure, B/A/B, B/A/C, or A/B/C three-layer structures can be exemplified. Further, based on the necessity, multilayered structure of more than three layers may be possible and the ratio of the thickness of the respective layers of the layered structure can be set as desired.

Further, the poly (lactic acid) biaxially drawn film is preferable to have a thermal shrinkage ratio in a range of −10 to 10% in at least one direction at the molding temperature in terms of the adhesion property and processibility, particularly suppression of film wrinkles at the time of processing. The thermal shrinkage ratio is further preferably in a range of −5 to +5%. If the thermal shrinkage ratio is within the range, good processibility can be obtained without problems such as deterioration of the appearance owing to expansion of film surface, separation from a substrate, or distortion of printings.

The poly(lactic acid) biaxially drawn film may be used while being molded. The molded article is considerably suppressed from thermal deformation under heating condition and can be used as a heat resistant container. The molding method is not particularly limited and conventionally known various molding methods such as straight molding, free drawing molding, plug and ring molding, skeleton molding, plug-assist molding and the like can be employed.

Next, a case of producing the biaxially drawn film by mixing the poly(lactic acid) polymer and the alloying component will be described in detail. The poly(lactic acid) polymer and the alloying component at a prescribed ratio in accordance with the properties by a weighing apparatus are supplied to a biaxially extruding apparatus. As the biaxially extruding apparatus, a bent type biaxially extruding apparatus is used preferably since the poly(lactic acid) polymer and the alloying component can be supplied in un-dried state. After the supplied poly(lactic acid) polymer and alloying component are melted and mixed at an extrusion temperature of 190 to 220° C. in accordance with the melt viscosity of the resin composition, the melted and mixed resin is led to a slit-like mouth cap and extruded like a sheet on a cooling casting die and an un-drawn film is molded. In the case of using a T die method, an electrostatic close deposition method or a touch roll casting method can be employed as quenching and particularly the electrostatic close deposition method can give an un-drawn film with an even thickness can be obtained.

Next, the un-drawn film is sent to a drawing apparatus and drawn by simultaneous or continuous biaxially drawing method. The order may be reverse. In the case of biaxially drawing, the drawing may be carried out in the longitudinal direction or the width direction two or more times.

The drawing method is not particularly limited and methods of roll drawing and tenter drawing can be employed. The film shape at the time of drawing may be flat, tubular, and any other shapes. The drawing magnification of the film in the longitudinal direction and the width direction can be set optionally depending on the aimed thermostabiliy, processibility, and deposition suitability, however in terms of the improvement of the thickness unevenness, it is preferably 1.5 to 6.0 times and the drawing temperature may be set to be any optional temperature if it is within a range of the glass transition temperature or higher of the poly(lactic acid) polymer composition, however it is preferably 60 to 150° C.

The thickness of the biaxially drawn film can be set optionally in accordance with the purposes of the use of the film and the thickness is generally in a range of 0.5 to 300 μm and in terms of the film formation stability, the thickness is preferably 1 to 200 μm and more preferably 5 to 180 μm.

The poly(lactic acid) biaxially drawn film can be improved in the adhesion property and the printing property based on the necessity by carrying out surface treatment such as corona discharge treatment. Further, various coatings may be formed and the types of the coating compounds, coating methods, and thickness are not particularly limited without departing the spirit and scope of the disclosure. If necessary, molding processing such as embossing process and printing may be carried out for use of the film.

The poly (lactic acid) biaxially drawn film obtained in such a manner can be used in form of a single film or a composite film for various industrial materials and wrapping materials required to have transparency and thermostability.

The molded article made of the poly(lactic acid) biaxially drawn film can also be used for various materials required to have transparency and thermostability. Practically, it can be used for various containers and wrapping materials in food industries, sanitary and daily life goods, agricultural and horticultural fields.

The resin composition is a mixture of the poly(lactic acid) and the cellulosic ester, which are a biomass type materials, and is a resin composition excellent in transparency, mechanical properties, and thermostability. Further, the biaxially drawn film which is excellent in transparency, mechanical properties, and thermostability is obtained by biaxially drawing a resin composition obtained by mixing poly(lactic acid) and at least one kind compound selected from cellulosic esters, poly(meth)acrylates, and polyvinyl compounds having a glass transition temperature of 60° C. or higher.

EXAMPLES

The compositions, films and methods will be described more in detail with reference to Examples.

[Evaluation Methods]

(1) Weight average molecular weight of poly(lactic acid)

The measurement was carried out using PMMA as standards and chloroform solvent at a column temperature of 40° C. by Warters 2690 manufactured Japan Warters. Inc.

(2) Substitution Degree of Cellulosic Ester

The measurement was carried out by adding 2N NaOH 40 ml to a sample 0.3 g, carrying out alkali-hydrolyzation at 70° C.×2 hours, neutralizing the solution by adding 1N HCl 80 ml, quantitatively determining esterification agent amount by high performance chromatography, and calculating the substitution degree per glucose unit.

(3) Glass Transition Temperature of Resin Composition

The glass transition temperature of the resin composition was calculated by measurement for a sample 5 mg at 20° C./min temperature increasing speed after keeping the sample at −30° C. for 5 minutes in nitrogen atmosphere using a differential scanning calorimeter RDC 220 model manufactured by Seiko Instruments Inc.

(4) Phase-contrast Microscopic Measurement of Resin Composition

The dispersion state of a resin composition was observed in the manner that 100 μm-thick specimen was cut out of a sample and melted again on a hot stage set at 210° C. and the state of the specimen after 10 minutes was observed by a phase-contrast microscope (Opti Shot manufactured by Nikon Co., Ltd.; magnification×10 (Ph1), relay×10).

(5) Light Scattering Measurement of Resin Composition

A 100 μm-thick specimen was cut out of a sample and the structural period or the inter-particle distance ($\Lambda m$) was calculated according to the following expression using a light scattering apparatus DYNA-3000 manufactured Otsuka Electronics Co., Ltd. Am corresponds to the structural period in the case of both continuous phase structure and corresponds to the inter-particle distance in the dispersion structure:

$$\Lambda m = (\lambda/2)/\sin(\theta m/2)$$

(6) Luminous Transmittance Measurement for Resin Composition

The transmittance of visible light with 400 nm wavelength was measuredusing a sheet made of a sample by spectrophotometer MPC 3100 manufactured by Shimadzu Corp.

(7) Dynamic Viscoelasticity of Resin Composition

A specimen with a size of length×width×thickness=40 mm×8 mm×0.2 mm was cut out of a sheet produce from a sample and thermally treated in a hot air oven adjusted at 140° C. for 1 hour and subjected to the dynamic viscoelasticity measurement with sinusoidal wave at 1 Hz by increasing the temperature from 0° C. at 2° C./min temperature increasing speed by EXSTAR 6000 viscoelasticity measurement apparatus manufactured by Seiko Instruments Inc. and the temperature at which the storage modulus was decreased to 1 GPa was defined to be the thermostability temperature.

(8) Mechanical Properties of Resin Composition

A specimen with a size of length×width×thickness=50 mm×10 mm×0.2 mm was cut out of a sheet produce from a sample and the tensile strength and the tensile elongation were measured at chuck distance 20 mm and pulling speed 10 mm/min under conditions of 23° C. and 50% RH environments by Tensilon UTA-4 manufactured by Orientec Co., Ltd.

(9) Degree of Crystallinity of Film

The x-ray deflection of a film was measured by cutting out a specimen of a size of 2 cm×2 cm from a 50 µm-thick film in standard measurement mode using a wide angle x-ray diffractometer (RINT 2000/PC) manufactured by.Rigaku Denki Co., Ltd. The degree of crystallinity was calculated from the obtained data by multiple peak separation method (SHADOW program).

(10) Film Haze of Biaxially Drawn Film

As an index of transparency of a biaxially drawn film sample, the haze value of a film sample whose thickness was previously measured was measured by a haze meter HGM-2DP type (manufactured by Suga Test Instruments Co., Ltd.). The measurement was carried out 5 times for one level and the film haze value [%] was calculated assuming the film had 10 µm thickness from the average of the 5 time measurement results.

(11) Modulus of Elasticity, Rupture Stress, and Rupture Elongation of Biaxially Drawn Film A film specimen with a size of width 10 mm×length 150 mm was cut out and the specimen was subjected to the tensile test under conditions of 80° C., an initial length of 50 mm, and a tensile speed of 300 mm/min by a tensile tester manufactured by Orientec Co., Ltd. according to JIS Z 1702 to measure the modulus of elasticity (MPa), the rupture stress (MPa), and the rupture elongation (%). These measurement values were of 5 samples in the longitudinal direction (MD) of the film and 5 samples in the transverse direction (TD).

The Resins Used were as Follows.

PLA-1: poly(lactic acid) (content of D-isomer 1.2%, poly (lactic acid) polymer with a weight average molecular weight of 160,000 on the basis of PMMA)

PLA-2: poly(lactic acid) (content of D-isomer 1.4%, poly (lactic acid) polymer with a weight average molecular weight of 70,000 on the basis of PMMA)

PLA-3: poly(lactic acid) (content of D-isomer 0.9%, poly (lactic acid) polymer with a weight average molecular weight of 40,000 on the basis of PMMA)

CAP-1: cellulose acetate propionate (CAP, acetate-substitution degree: 0.1, propionate substitution degree: 2.6, manufactured by Eastman Chemical, Co., Ltd.)

CTA-1: cellulose triacetate (LT-35, acetate-substitution degree: 2.93, manufactured by Daicel Chem. Ind., Ltd.)

CDA-1: cellulose diacetate (LT-40, acetate-substitution degree: 2.42, manufactured by Daicel Chem. Ind., Ltd.)

CEL-1: cellulose (cellulose powder, Aldrich Reagent)

AL-1: organoaluminum compound (acetoalkoxyaluminum diisopropylate, Plenact AL-M manufactured by Ajinomoto Fine Techno Co., Inc.)

TI-1: organotitanium compound, (titanium tetraisopropoxide, manufactured by Tokyo Kasei Kogyo Co., Ltd.)

P-1: methacrylic resin-modified high molecular weight compound (poly(ethylene/ethyl acrylate/maleic anhydride)-g-poly(methyl methacrylate) (E/EA/MAH-g-PMMA): Modiper A8200, manufactured by Nippon Oil & Fats Co., Ltd.)

PMMA: poly (methyl methacrylate) (Smipeck MGSS, manufactured by Sumitomo Chemical Co., Ltd.)

PVPh: poly(vinyl phenol) (MARUKALYNCUR S-2P, glass transition temperature: 146° C., manufactured by Maruzen Petrochemical Co., Ltd.)

PVAc: poly(vinyl acetate) (glass transition temperature:30° C., manufactured by Aldrich Reagent)

Examples 1 to 7

The raw materials of compositions shown in Table 1 were supplied to a biaxial extruder (PCM-30, manufactured by Ikegai Kogyo Co., Ltd.) set at an extrusion temperature of 210° C. and guts discharged out of dies were immediately quenched in ice water to fix the structures and then pelletized. The obtained pallets were all transparent.

With respect to the samples cut out of the pellets, the resin compositions were subjected to glass transition temperature measurement. The results are shown in Table 1.

Specimens with 100 µm thickness were cut out of the pellets and re-melted on a hot stage set at 210° C. and the structures measured by a phase-contrast microscope at that time and the results are shown in Table 1.

Figure 2:
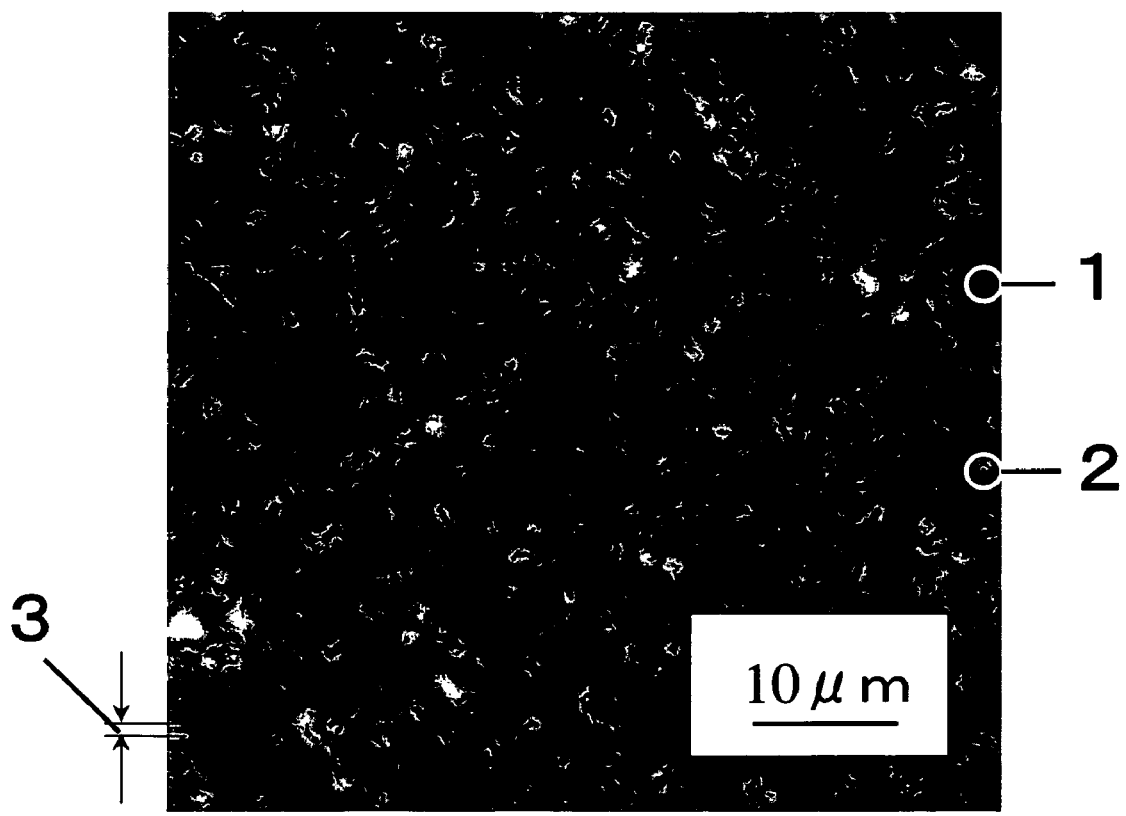
FIG. 2 is a phase-contrast microscopic photograph showing the dispersion state of the respective components of the composition of Example 3.

Practically, the results are as shown in FIG. 1 and FIG. 2. In FIG. 1 showing the dispersion state of the respective components of the composition of Example 1, no structure was observed and in FIG. 2 showing the dispersion state of the respective components of the composition of Example 3, a regular both continuous phase structure was observed.

With respect to Examples 2, 3, and 5 in which structures were confirmed, 100 µm-thick specimens were cut out of guts with fixed structure by quenching in ice water and the structure period and inter-particle distance (Λm) were measured (Table 1) by a light scattering apparatus.

The pellets obtained in the above-mentioned manner were melted by a uniaxial extruder set at an extrusion temperature of 210° C. and then extruded into sheet-like form from a slit-like die and closely attached to a casting drum by electrostatic application method to obtain 200 µm-thick sheets. The transmittance of visible light with 400 nm wavelength of the sheets were measured (Table 1).

Figure 3:
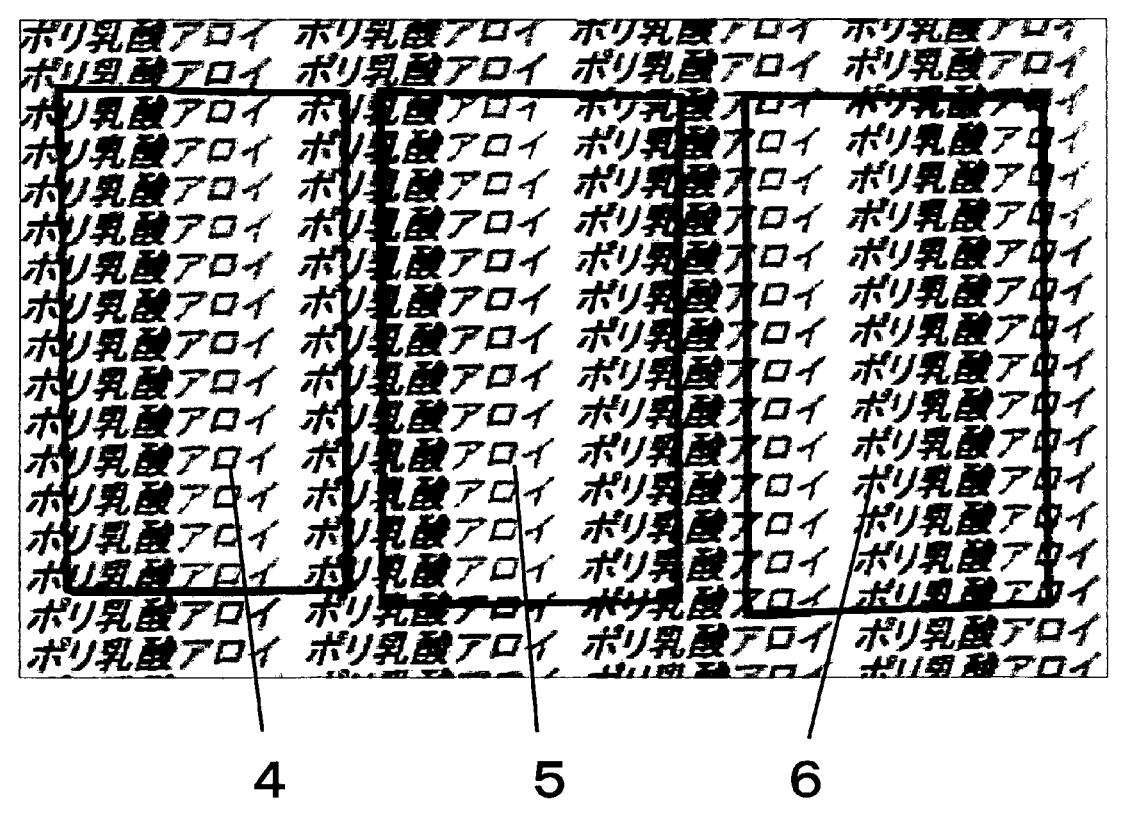

FIG. 3 shows a photograph of a sheet. According to the photograph, letters in the background can be seen through the sheet and therefore, the sheet of the disclosure was found excellent in the transparency.

Separately, a dynamic viscoelasticity test of the sheets were carried out to calculate the thermostability temperature. The results are shown in Table 1. The results of the tensile strength and tensile elongation measurement of the sheets are also shown in Table 1.

Examples 8 to 15

The sheets were drawn at a preheating temperature of 90° C. in the longitudinal direction at magnifications-shown in Table 2 and drawn at a preheating temperature of 78° C. in the transverse direction at magnifications shown in Table 2 to adjust the thickness to be 80 µm and then the sheets were thermally treated at 140° C. for 10 seconds to obtain biaxially drawn films. The film characteristics of the obtained films were shown in Table 2.

Each biaxially drawn film was cut into 50 mm×10 mm (length×width) and drawn to be 2 times as long in longitudinal direction at 80° C. preheating to obtain a molded article. After that, without applying force such as the tensile force or load from the outside, the film was put in a hot air oven set at a temperature of 80° C. for 2 minutes to observe the thermal deformation (thermal shrinkage) before and after loading. The results are shown in Table 2. The occurrence of thermal deformation of each molded article was determined by the following standards:

A: less than 10%;
B: 10% or higher and less than 20%;
C: 20% or higher and less than 35%;
D: 35% or higher.

Further, each biaxially drawn film was vacuum-molded (straight molded) and then, without applying force such as tensile force or load from the outside, the film was put in a hot air oven set at a temperature of 80° C. for 2 minutes in the state that only self-weight was applied to observe the thermal deformation before and after loading owing to the self-weight. The results are shown in Table 2. The occurrence of thermal deformation of each molded article was determined by the following standards:

A: no deformation observed;
B: although warping or sagging was observed partially, the shape was retained;
C: although slight warping or sagging was observed, there was no problem for practical use;
D: shape was not retained.

Examples 16 to 21

The raw materials of compositions shown in Table 3 were supplied to a biaxial screw extruder (PCM-30, manufactured by Ikegai Kogyo Co., Ltd.) set at an extrusion temperature of 225° C. and guts discharged out of dies were immediately quenched in ice water to fix the structures and then pelletized. The obtained pallets were all transparent.

With respect to the samples cut out of the pellets, the resin compositions were subjected to glass transition temperature measurement. The results are shown in Table 3.

Specimens with 100 μm thickness were cut out of the pellets and re-melted on a hot stage set at 210° C. and the structures measured by a phase-contrast microscope at that time and the results are shown in Table 3.

The pellets obtained in the above-mentioned manner were melted by a uniaxial extruder set at an extrusion temperature of 210° C. and then extruded into sheet-like form from a slit-like die and closely attached to a casting drum by electrostatic application method to obtain 200 μm-thick sheets. The transmittance of visible light with 400 nm wavelength of the sheets were measures (Table 3).

Separately, a dynamic viscoelasticity test of the sheets were, carried out to calculate the thermostability temperature. The results are shown in Table 3.

Examples 22 to 26

The sheets were drawn at a preheating temperature of 90° C. in the longitudinal direction at magnifications shown in Table 4 and drawn at a preheating temperature of 78° C. in the transverse direction at magnifications shown in Table 4 to adjust the thickness to be 80 μm and then the sheets were thermally treated at 140° C. for 10 seconds to obtain biaxially drawn films. The film characteristics of the obtained films were shown in Table Examples 27 to 30

Next, the biaxially drawn films produced in the same manner as Examples 8, 11, 23, and 25 were subjected to a tensile test at 80° C. The results of the tensile test were shown in Table 5.

Examples 31 to 35

The raw materials of compositions shown in Table 6 were supplied to a biaxial screw extruder (PCM-30, manufactured by Ikegai Kogyo Co., Ltd.) set at an extrusion temperature of 225° C. and guts discharged out of dies were immediately quenched in ice water to fix the structures and then pelletized. The obtained pallets were all transparent.

With respect to the samples cut out of the pellets, the resin compositions were subjected to glass transition temperature measurement. The results are shown in Table 6.

Specimens with 100 μm thickness were cut out of the pellets and re-melted on a hot stage set at 210° C. and the structures measured by a phase-contrast microscope at that time and the results are shown in Table 6.

The pellets obtained in the above-mentioned manner were melted by a uniaxial extruder set at an extrusion temperature of 210° C. and then extruded into sheet-like form from a slit-like die and closely attached to a casting drum by electrostatic application method and then the obtained sheets were drawn at a preheating temperature of 90° C. in the longitudinal direction at magnifications shown in Table 6 and drawn at a preheating temperature of 85° C. in the transverse direction at magnifications shown in Table 6 to adjust the thickness to be 80 μm and then the sheets were thermally treated at 140° C. for 10 seconds to obtain biaxially drawn films. The film characteristics of the obtained films were shown in Table 6.

Table 7 shows Comparative Examples 1 to 3.

Comparative Example 1

Melt-kneading and melt-film formation were carried out in the same manner as Examples 1 to 6 and Examples 7 to 13, except that no cellulosic ester was added to obtain a Comparative sample for the cellulosic ester mixtures.

Comparative Example 2

Melt-kneading and melt-film formation were carried out in the same manner as Examples 1 to 6, except that cellulose which was not esterified was used in place of the cellulosic ester to obtain a Comparative sample for the cellulosic ester mixtures.

Comparative Example 3

Melt-kneading and melt-film formation were carried out in the same manner as Examples 1 to 6, except that poly(lactic acid) (PLA-3) with a weight average molecular weight of 40,000 was used in place of the poly(lactic acid) (PLA-1 or 2) to obtain a Comparative sample for the PLA-1 or 2.

Table 8 shows Comparative Examples 4 to 7.

Comparative Example 4

Melt-kneading, melt-film formation, preheating drawing, and thermal treatment were carried out in the same manner as Examples 1 to 6 and Examples 7 to 13, except that no cellulosic ester was added to obtain a Comparative sample for the cellulosic ester mixtures.

Comparative Example 5

Melt-kneading and melt-film formation were carried out in the same manner as Examples 1 to 6 and Examples 7 to 13, except that cellulose which was not esterified was used in place of the cellulosic ester to obtain a Comparative sample for the cellulosic ester mixtures.

Comparative Example 6

Melt-kneading, melt-film formation, preheating drawing, and thermal treatment were carried out in the same manner as Examples 29 to 33, except that no drawing was carried out to obtain a Comparative sample for drawn films.

Comparative Example 7

Melt-kneading, melt-film formation, preheating, drawing, and thermal treatment were carried out in the same manner as Examples 1 to 6 and Examples 7 to 13, except that poly(vinyl acetate) was used in place of the (B) component to obtain a Comparative sample for the high glass transition temperature polymer alloys.

INDUSTRIAL APPLICABILITY

The compositions provide films usable for various kinds of wrapping materials, various kinds of industrial materials, and films for various industrial materials, and its application range should not be limited to these exemplified fields.

TABLE 1

(resin characteristics 1)

| | | Example 1 | Example 2 | Example 3 | Example 4 | Example 5 | Example 6 | Example 7 |
|---|---|---|---|---|---|---|---|---|
| Composition | | | | | | | | |
| Poly(lactic acid) resin | (wt. %) | PLA-1 | PLA-1 | PLA-1 | PLA-1 | PLA-1 | PLA-1 | PLA-2 |
| | | 95 | 90 | 80 | 80 | 80 | 40 | 80 |
| Cellulosic ester | (wt. %) | CAP-1 | CAP-1 | CAP-1 | CTA-1 | CDA-1 | CAP-1 | CAP-1 |
| | | 5 | 10 | 20 | 20 | 20 | 60 | 20 |
| Resin characteristics | | | | | | | | |
| Glass transition temperature | (° C.) | 73 | 68 | 67 | 70 | 67 | 78 | 62 |
| Phase-contrast microscopic observation | | No structure | Both phase-continuing structure | Both phase-continuing structure | No structure | Both phase-continuing structure | Both phase-continuing structure | Both phase-continuing structure |
| Light scattering measurement (Λm) | (μm) | — | 0.7 | 1.1 | — | 2.1 | 3.2 | 0.9 |
| Luminous transmittance (400 nm) | (%) | 83 | 68 | 52 | 65 | 43 | 28 | 55 |
| Heat resistant temperature | (° C.) | 75 | 83 | 90 | 117 | 103 | 129 | 77 |
| Mechanical characteristics | | | | | | | | |
| Tensile strength | (MPa) | 70 | 71 | 72 | 71 | 63 | 78 | 70 |
| Tensile elongation | (%) | 10 | 22 | 35 | 33 | 28 | 9 | 23 |

TABLE 2

(film characteristics 1)

| | | Example 8 | Example 9 | Example 10 | Example 11 | Example 12 | Example 13 | Example 14 | Example 15 |
|---|---|---|---|---|---|---|---|---|---|
| Example of resins used | | Example 1 | Example 2 | Example 3 | Example 3 | Example 4 | Example 5 | Example 6 | Example 7 |
| Film characteristics | | | | | | | | | |
| Film drawing magnitude (longitudinal direction × transverse direction) | | 2.7 × 2.7 | 2.7 × 2.7 | 2.2 × 2.2 | 2.7 × 2.7 | 2.7 × 2.7 | 2.7 × 2.7 | 2.7 × 2.7 | 2.7 × 2.7 |
| Degree of crystallinity | (%) | 67 | 65 | 54 | 63 | 61 | 58 | 36 | 60 |
| Film haze | (%) | 21 | 30 | 62 | 79 | 23 | 85 | 90 | 68 |
| Moldered article characteristics | | | | | | | | | |
| Thermal shrinkage | | C | C | C | B | A | A | A | C |
| Occurrence of thermal deformation (80° C. × 2 min) | | C | C | C | B | A | A | A | C |

TABLE 3

(resin characteristics 2)

| | | Example 16 | Example 17 | Example 18 | Example 19 | Example 20 | Example 21 |
|---|---|---|---|---|---|---|---|
| Composition | | | | | | | |
| Poly(lactic acid) | (wt. %) | PLA-1 95 | PLA-1 95 | PLA-1 95 | PLA-1 90 | PLA-1 80 | PLA-1 70 |
| Cellulosic ester | (wt. %) | CAP-1 5 | CAP-1 5 | CAP-1 5 | CAP-1 10 | CAP-1 20 | CDA-1 30 |
| Solvation agent | (wt. %) | AL-1 1 | TI-1 1 | P-1 1 | P-1 1 | P-1 1 | P-1 1 |
| Resin characteristics | | | | | | | |
| Glass transition temperature | (° C.) | 73 | 72 | 65 | 65 | 65 | 64 |
| Phase-contrast microscopic observation | | No structure | No structure | No structure | No structure | No structure | No structure |
| Light scattering measurement (Λm) | (μm) | — | 0.7 | 1.1 | — | — | 2.1 |
| Luminous transmittance (400 nm) | (%) | 90 | 90 | 91 | 89 | 88 | 86 |
| Heat resistant temperature | (° C.) | 83 | 81 | 80 | 85 | 91 | 105 |

TABLE 4

(film characteristics 2)

| | | Example 22 | Example 23 | Example 24 | Example 25 | Example 26 |
|---|---|---|---|---|---|---|
| Example of resins used | | Example 18 | Example 18 | Example 19 | Example 20 | Example 21 |
| Film characteristics | | | | | | |
| Film drawing magnitude (longitudinal direction × transverse direction) | | 2.2 × 2.2 | 2.7 × 2.7 | 2.7 × 2.7 | 2.7 × 2.7 | 2.7 × 2.7 |
| Degree of crystallinity | (%) | 59 | 57 | 49 | 51 | 53 |
| Film haze | (%) | 2 | 3 | 3 | 4 | 7 |
| Moldered article characteristics | | | | | | |
| Thermal shrinkage | | B | B | B | A | A |
| Occurrence of thermal deformation (80° C. × 2 min) | | B | B | B | A | A |

TABLE 5

(film characteristics 3)

| | Example 27 | Example 28 | Example 29 | Example 30 |
|---|---|---|---|---|
| Films used in Examples | Example 8 | Example 11 | Example 23 | Example 25 |
| Film characteristics | | | | |
| Results of tensile test (80° C.) | | | | |
| Modulus of elasticity (MPa) | 760 | 750 | 860 | 800 |
| Rupture elongation (%) | 240 | 120 | 270 | 130 |
| Rupture stress (MPa) | 28 | 35 | 43 | 50 |

TABLE 6

| | | Example 31 | Example 32 | Example 33 | Example 34 | Example 35 |
|---|---|---|---|---|---|---|
| Composition | | | | | | |
| Poly(lactic acid) | (wt. %) | PLA-1 90 | PLA-1 80 | PLA-1 50 | PLA-1 90 | PLA-1 80 |
| Alloying component | (wt. %) | PMMA 10 | PMMA 20 | PMMA 50 | PVPh 10 | PVPh 20 |

TABLE 6-continued

|  |  | Example 31 | Example 32 | Example 33 | Example 34 | Example 35 |
|---|---|---|---|---|---|---|
| Resin characteristics |  |  |  |  |  |  |
| Glass transition temperature | (° C.) | 68 | 70 | 77 | 69 | 75 |
| Phase-contrast microscopic observation |  | No structure | No structure | No structure | No structure | No structure |
| Light scattering measurement (Λm) | (μm) | — | — | — | — | — |
| Film characteristics |  |  |  |  |  |  |
| Film drawing magnification (longitudinal direction × transverse direction) |  | 2.7 × 2.7 | 2.7 × 2.7 | 2.7 × 2.7 | 2.7 × 2.7 | 2.7 × 2.7 |
| Degree of crystallinity | (%) | 49 | 44 | 31 | 54 | 45 |
| Film haze | (%) | 1 | 1 | 1 | 2 | 2 |
| Results of tensile test (80° C.) |  |  |  |  |  |  |
| Modulus of elasticity | (MPa) | 290 | 370 | 620 | 430 | 700 |
| Rupture elongation | (%) | 360 | 390 | 210 | 220 | 130 |
| Rupture stress | (MPa) | 39 | 43 | 66 | 13 | 19 |

TABLE 7

|  | Comparative Example 1 | Comparative Example 2 | Comparative Example 3 |
|---|---|---|---|
| Composition |  |  |  |
| Poly(lactic acid) (wt. %) | PLA-1 100 | PLA-1 80 | PLA-3 80 |
| Cellulosic ester (wt. %) | — | CEL-1 20 | CAP-1 20 |
| Resin characteristics |  |  |  |
| Glass transition temperature (° C.) | 67 | 67 | 58 |
| Phase-contrast microscopic observation | — | Composite *) | Difficulties of forming a sheet |
| Light scattering measurement (Λm) (μm) | — | — |  |
| Luminous transmittance (400 nm) (%) | 85 | 5 |  |
| Thermostability temperature (° C.) | 65 | 110 |  |
| Mechanical characteristics |  |  |  |
| Tensile strength (MPa) | 66 | 65 |  |
| Tensile elongation (%) | 3 | 1 |  |

*) Composite: a structure comprising poly(lactic acid) polymer matrix and cellulose compounded in the matrix in fibrous and insoluble and un-fused state was observed.

TABLE 8

|  | Comparative Example 4 | Comparative Example 5 | Comparative Example 6 | Comparative Example 7 |
|---|---|---|---|---|
| Composition |  |  |  |  |
| Poly(lactic acid) (wt. %) | PLA-1 100 | PLA-1 80 | PLA-1 80 | PLA-1 80 |
| Alloying component (wt. %) | — | CEL-1 20 | PMMA 20 | PVAc 20 |
| Resin characteristics |  |  |  |  |
| Glass transition temperature (° C.) | 67 | 67 | 67 | 55 |
| Phase-contrast microscopic observation | — | Composite *) | No structure | No structure |
| Light scattering measurement (Λm) (μm) | — | — | — | — |
| Film characteristics |  |  |  |  |
| Film drawing magnification (longitudinal direction × transverse direction) | 2.7 × 2.7 | Difficulty of film formation | No drawability | 2.7 × 2.7 |
| Degree of crystallinity (%) | 72 | — | 67 | 42 |
| Results of tensile test (80° C.) |  |  | Transparency deterioration |  |
| Modulus of elasticity (MPa) | 260 | — |  | 120 |
| Rupture elongation (%) | 320 | — |  | 170 |
| Rupture stress (MPa) | 35 | — |  | 16 |

TABLE 8-continued

|  | Comparative Example 4 | Comparative Example 5 | Comparative Example 6 | Comparative Example 7 |
|---|---|---|---|---|
| Molded article characteristics |  |  |  |  |
| Thermal shrinkage | D | — | Difficulty of molding | D |
| Occurrence of thermal deformation (80° C. × 2 min) | D | — | Difficulty of molding | D |

*) Composite: a structure comprising poly(lactic acid) polymer matrix and cellulose compounded in the matrix in fibrous and insoluble and un-fused state was observed.

The invention claimed is:

1. A poly(lactic acid) polymer composition containing (A) a poly(lactic acid) polymer with a weight average molecular weight of 50,000 or higher and (B) a cellulosic ester, wherein the substitution degree of hydroxyl groups in the cellulosic ester (the average number of the hydroxyl groups substituted by the cellulosic ester) is 1.8 to 2.9 per glucose unit in the cellulosic ester, and the (A) poly(lactic acid) polymer and the (B) cellulosic ester are solvated and/or have a phase structure with 0.01 μm or smaller in the poly(lactic acid) polymer composition.

2. A poly(lactic acid) polymer composition containing (A) a poly(lactic acid) polymer with a weight average molecular weight of 50,000 or higher and (B) a cellulosic ester, wherein the substitution degree of hydroxyl groups in the cellulosic ester (the average number of the hydroxyl groups substituted by the cellulosic ester) is 1.8 to 2.9 per glucose unit in the cellulosic ester, and the composition has both a continuous phase structure with 0.01 to 3 μm structure period or a dispersion structure with 0.01 to 3 gm inter-particle distance.

3. The poly(lactic acid) polymer composition according to claim 1, wherein the (B) component is at least one cellulosic ester selected from a group consisting of cellulose acetate, cellulose diacetate, cellulose triacetate, cellulose acetate propionate, cellulose acetate butyrate, and cellulose acetate phthalate.

4. The poly(lactic acid) polymer composition according to claim 1, further containing one or more kinds of (C) solvation agents for improving the compatibility of the poly(lactic acid) polymer and cellulosic esters.

5. A production method of the poly(lactic acid) polymer composition according to claim 1, comprising melt-kneading (A) a poly(lactic acid) polymer with a weight average molecular weight of 50,000 or higher and (B) a cellulosic ester.

6. A poly(lactic acid) biaxially drawn film containing (A) a poly(lactic acid) polymer with a weight average molecular weight of 50,000 or higher and (B) at least one compound selected from cellulosic esters, poly(meth) acrylates, and polyvinyl compounds having a glass transition temperature of 60° C. or higher, wherein the substitution degree of hydroxyl groups in the cellulosic ester (the average number of the hydroxyl groups substituted by the cellulosic ester) is 1.8 to 2.9 per glucose unit in the cellulosic ester, and the (A) component and the (B) component are solvated and/or have a phase structure with 0.01 μm or smaller.

7. A poly(lactic acid) biaxially drawn film containing (A) a poly(lactic acid) polymer with a weight average molecular weight of 50,000 or higher and (B) at least one compound selected from cellulosic esters, poly(meth) acrylates, and polyvinyl compounds having a glass transition temperature of 60° C. or higher, wherein the substitution degree of hydroxyl groups in the cellulosic ester (the average number of the hydroxyl groups substituted by the cellulosic ester) is 1.8 to 2.9 per glucose unit in the cellulosic ester, and the poly (lactic acid) polymer composition has both a continuous phase structure with 0.01 to 3 μm structure period or a dispersion structure with 0.01 to 3 μm inter-particle distance.

8. The poly(lactic acid) biaxially drawn film according to claim 6, having a degree of crystallinity 50% or higher.

9. The poly(lactic acid) biaxially drawn film according to claim 6, having a film haze value on the basis of 10 μm thickness 10% or lower.

10. The poly(lactic acid) biaxially drawn film according to claim 6, wherein the content of the (B) component is in a range of 1% by weight or more and less than 50% by weight in the total content of the (A) component and the (B) component.

11. The poly(lactic acid) biaxially drawn film according to claim 6, wherein the cellulosic ester of the (B) component is a cellulosic ester obtained by terminating hydroxyl groups of the cellulose with an esterification agent having 1 to 10 carbon atoms.

12. The poly(lactic acid) biaxially drawn film according to claim 6, wherein the cellulosic ester of the (B) component is at least one kind cellulosic ester selected from a group consisting of cellulose diacetate, cellulose triacetate, and cellulose acetate propionate.

13. The poly(lactic acid) biaxially drawn film according to claim 6, wherein the poly(meth) acrylate of the (B) component is poly(methyl methacrylate).

14. The poly(lactic acid) biaxially drawn film according to claim 6, wherein the polyvinyl compound of the (B) component is poly(vinyl phenol).

15. The poly(lactic acid) biaxially drawn film according to claim 6, containing one or more kinds of (C) solvation agents for improving the compatibility of the poly(lactic acid) polymer and the (B) component in addition to the (A) and (B) components.

16. A molded article made of poly(lactic acid) polymer composition containing (A) a poly(lactic acid) polymer with a weight average molecular weight of 50,000 or higher and (B) at least one compound selected from cellulosic esters, poly(meth) acrylates, and polyvinyl compounds having a glass transition temperature of 60° C. or higher, wherein the substitution degree of hydroxyl groups in the cellulosic ester (the average number of the hydroxyl groups substituted by the cellulosic ester) is 1.8 to 2.9 per glucose unit in the cellulosic ester.

17. A molded article made of poly(lactic acid) polymer composition according to claim 1.

18. A molded article made of poly(lactic acid) polymer composition according to claim 2.

19. A molded article made of poly(lactic acid) polymer composition according to claim 3.

20. A molded article made of poly(lactic acid) polymer composition according to claim 4.

21. The poly(lactic acid) polymer composition according to claim 2, wherein the (B) component is at least one cellulosic ester selected from a group consisting of cellulose acetate, cellulose diacetate, cellulose triacetate, cellulose acetate propionate, cellulose acetate butyrate, and cellulose acetate phthalate.

22. The poly(lactic acid) polymer composition according to claim 2, further containing one or more kinds of (C) solvation agents for improving the compatibility of the poly(lactic acid) polymer and cellulosic esters.

23. A production method of the poly(lactic acid) polymer composition according to claim 2, comprising melt-kneading (A) a poly(lactic acid) polymer with a weight average molecular weight of 50,000 or higher and (B) a cellulosic ester.

\* \* \* \* \*

UNITED STATES PATENT AND TRADEMARK OFFICE
CERTIFICATE OF CORRECTION

PATENT NO. : 7,718,718 B2 Page 1 of 1
APPLICATION NO. : 10/550666
DATED : May 18, 2010
INVENTOR(S) : Kanzawa et al.

It is certified that error appears in the above-identified patent and that said Letters Patent is hereby corrected as shown below:

On the Title Page

At (75), please change "Sakayuki" to --Sadayuki--.

Signed and Sealed this

Twenty-first Day of December, 2010

David J. Kappos
*Director of the United States Patent and Trademark Office*